(12) United States Patent
Beck

(10) Patent No.: US 7,681,897 B2
(45) Date of Patent: Mar. 23, 2010

(54) WHEEL SUSPENSION

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 269 days.

(21) Appl. No.: 11/652,889

(22) Filed: Jan. 12, 2007

(65) Prior Publication Data

US 2007/0200311 A1  Aug. 30, 2007

(30) Foreign Application Priority Data

Feb. 24, 2006  (DE) ................. 10 2006 008 608

(51) Int. Cl.
  *B60G 11/56* (2006.01)
  *B60G 17/04* (2006.01)
  *F16F 9/34* (2006.01)

(52) U.S. Cl. ............. 280/124.16; 280/124.162; 188/322.13

(58) Field of Classification Search .......... 188/316, 188/317, 322.13, 322.15, 322.21, 352, 322.12; 280/5.508, 5.51, 124.106, 124.157, 124.16, 280/124.161, 124.162
See application file for complete search history.

(56) References Cited

U.S. PATENT DOCUMENTS

| | | | | | |
|---|---|---|---|---|---|
| 2,163,255 | A | * | 6/1939 | Klein et al. ............ | 188/322.12 |
| 2,183,129 | A | * | 12/1939 | Binder et al. ............. | 267/34 |
| 2,215,751 | A | * | 9/1940 | Coleman ............ | 280/124.106 |
| 2,384,186 | A | * | 9/1945 | Magrum et al. .......... | 137/493.3 |
| 2,713,401 | A | * | 7/1955 | Serste et al. ............. | 188/288 |
| 2,905,458 | A | * | 9/1959 | Mason ............ | 267/128 |
| 2,988,376 | A | * | 6/1961 | Chausson ............ | 280/6.152 |
| 3,151,856 | A | * | 10/1964 | Bresk et al. ............ | 267/64.13 |
| 3,826,343 | A | * | 7/1974 | Heymann ............ | 188/282.8 |
| 3,827,539 | A | * | 8/1974 | Fader et al. ............ | 188/282.5 |
| 4,813,519 | A | * | 3/1989 | Matsubara et al. ....... | 188/266.4 |
| 4,828,232 | A | * | 5/1989 | Harrod et al. ............ | 267/64.24 |
| 4,890,822 | A | * | 1/1990 | Ezure et al. ............ | 267/64.23 |
| 4,923,038 | A | * | 5/1990 | Lizell ............ | 188/266.2 |
| 5,183,285 | A | * | 2/1993 | Bianchi ............ | 280/6.158 |
| 5,810,128 | A | * | 9/1998 | Eriksson et al. ............ | 188/289 |
| 6,883,651 | B2 | * | 4/2005 | Fukaya ............ | 188/322.12 |
| 7,350,793 | B2 | * | 4/2008 | Munday ............ | 280/124.106 |
| 7,469,910 | B2 | * | 12/2008 | Munster et al. .......... | 280/5.514 |
| 2005/0121274 | A1 | * | 6/2005 | Fujita et al. ............ | 188/322.19 |
| 2005/0199457 | A1 | * | 9/2005 | Beck ............ | 188/314 |

FOREIGN PATENT DOCUMENTS

| | | |
|---|---|---|
| DE | 10227417 A1 * | 2/2004 |
| DE | 10 2004 019 991 | 11/2005 |
| JP | 06229437 A * | 8/1994 |

* cited by examiner

*Primary Examiner*—Paul N Dickson
*Assistant Examiner*—Laura Freedman
(74) *Attorney, Agent, or Firm*—Cohen Pontani Lieberman & Pavane LLP

(57) ABSTRACT

A wheel suspension includes a working cylinder, a main spring in parallel with the working cylinder, and a piston rod extending from the working cylinder and having a longitudinal axis, the piston rod having fixed thereto a piston and a mount for fixing the piston rod against movement with respect to a vehicle body. The piston is mounted with freedom of axial movement in an adjusting cylinder, the piston dividing the cylinder into a space above the piston and a space below the piston, and an additional spring is located on the longitudinal axis for supporting the adjusting cylinder against the working cylinder. A shut-off element is located in a flow connection connecting the space above the piston to the space below the piston, whereby movement of the piston in the adjusting cylinder can be blocked when the vehicle rolls.

9 Claims, 5 Drawing Sheets

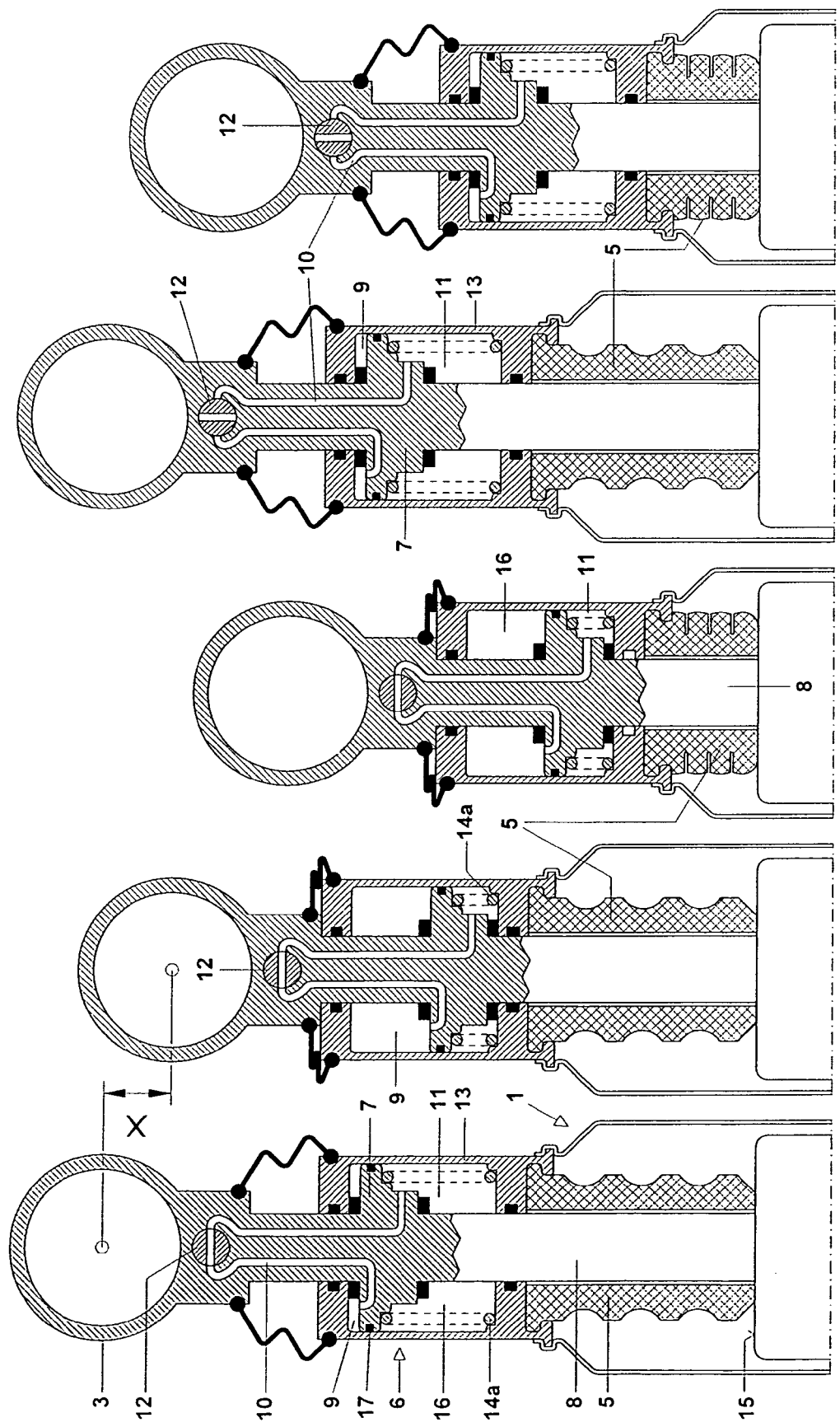

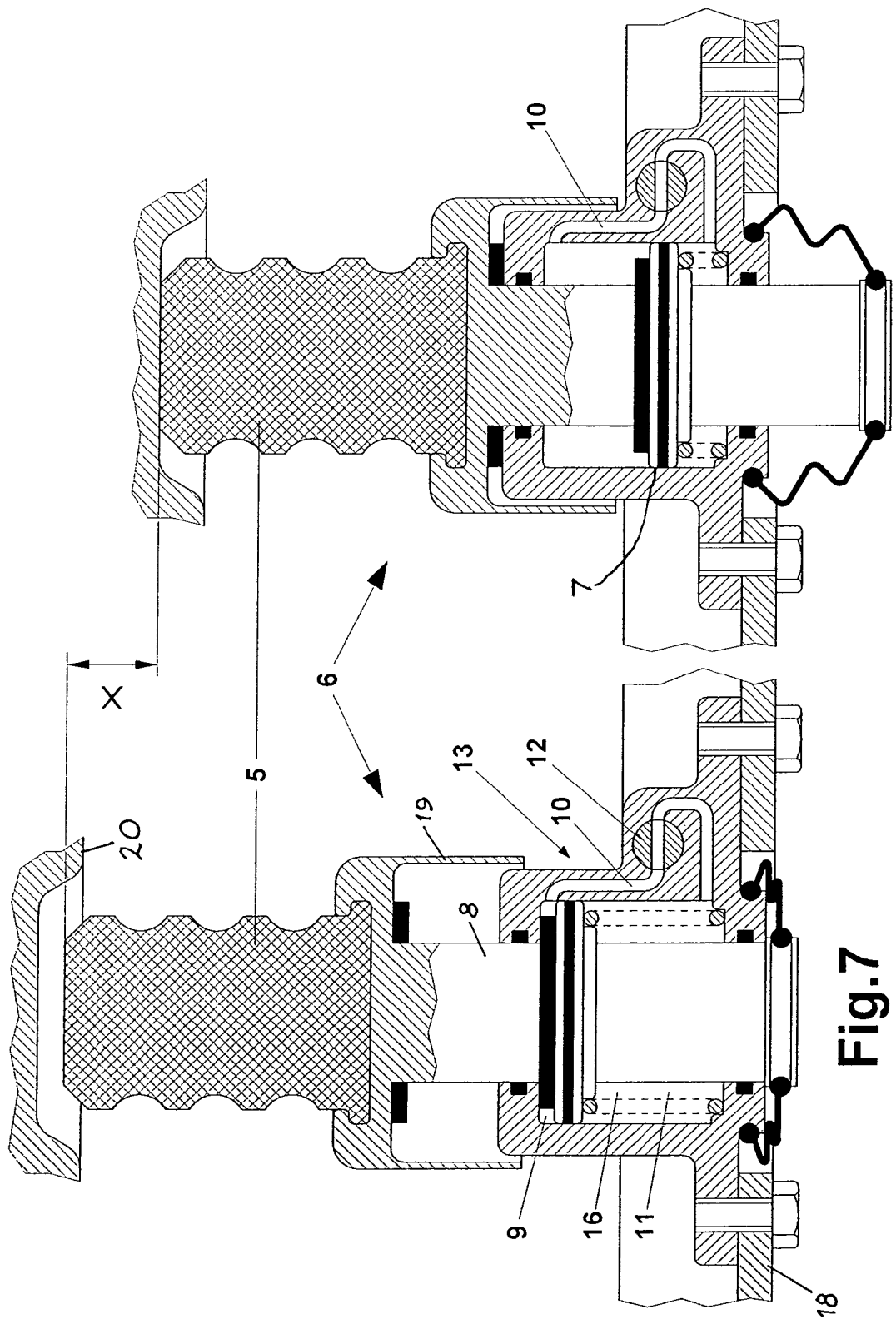

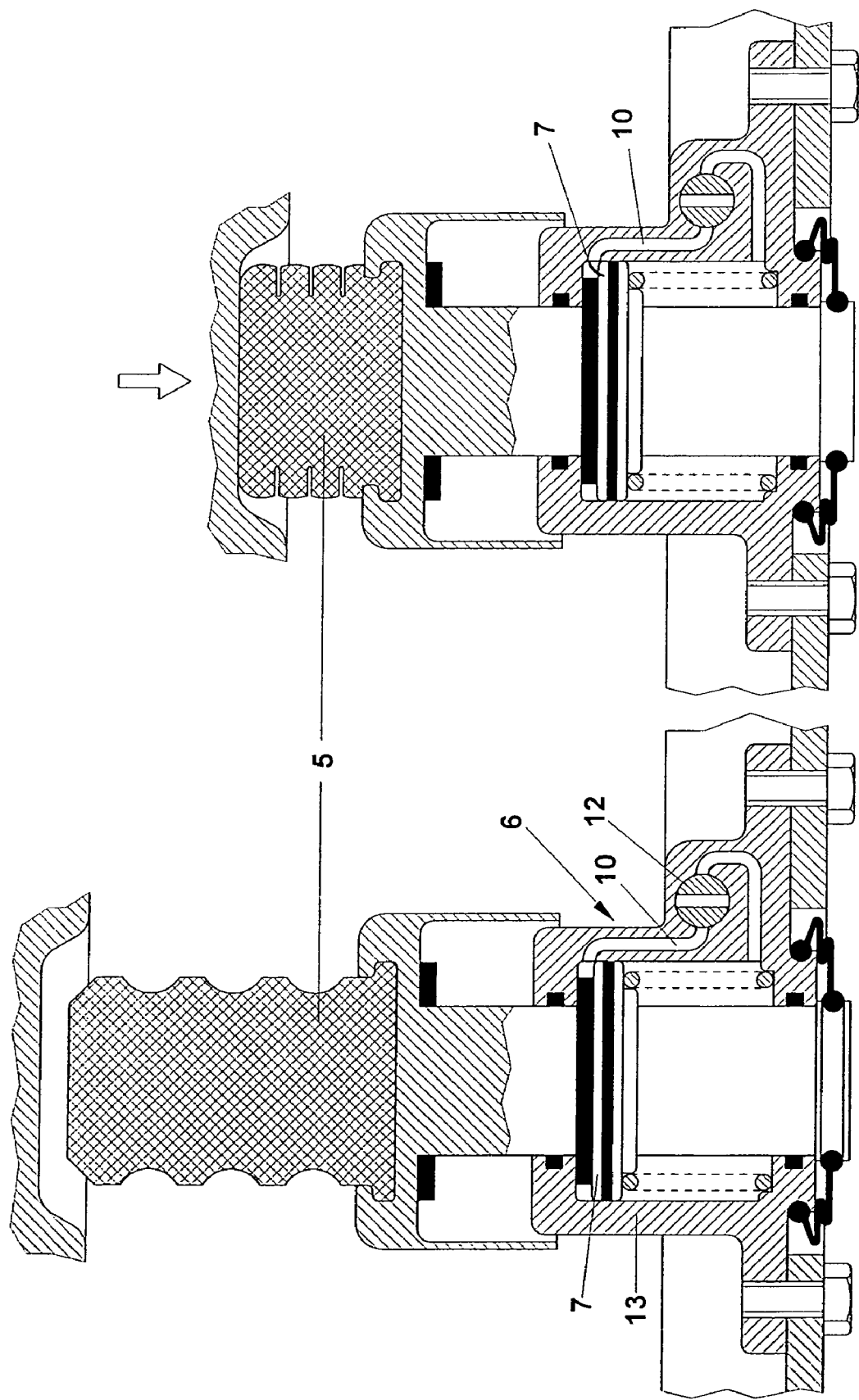

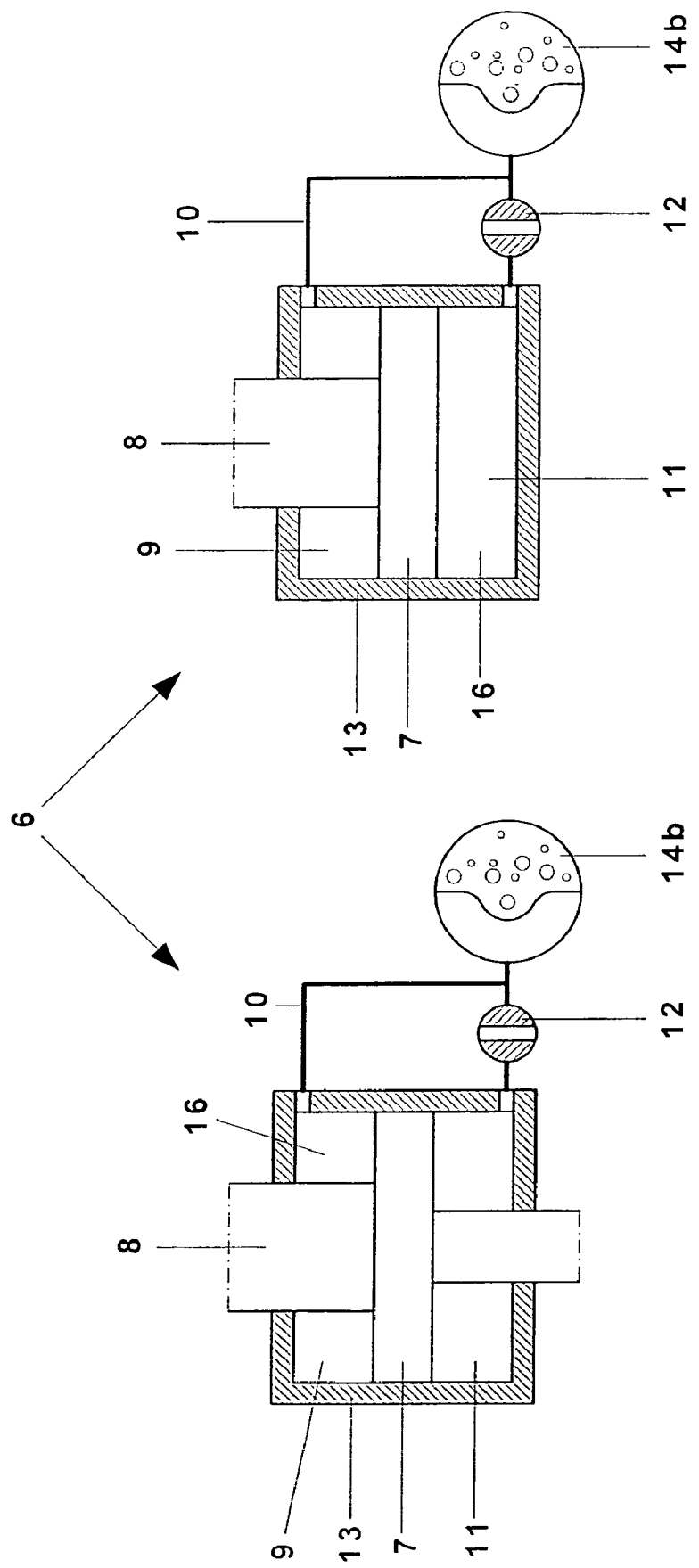

WHEEL SUSPENSION

BACKGROUND OF THE INVENTION

1. Field of the Invention

The invention pertains to a wheel suspension, comprising a piston-cylinder assembly with a working cylinder, a piston rod, and damping valves; a main spring connected in parallel; an additional spring, by means of which the working cylinder of the piston-cylinder assembly is supported against a vehicle body; and a piston arrangement by means of which the mounts supporting the additional spring can be adjusted relative to the vehicle body on the longitudinal axis of the piston rod.

2. Description of the Related Art

In motor vehicles, especially in the case of vehicles with high centers of gravity, there is a tendency for the wheel on the outside of the curve to undergo too much inward spring deflection when the vehicle is traveling around a curve. For many years, efforts have been made to counteract this rolling tendency around the longitudinal axis of the vehicle by taking measures to increase the transverse stability. There are also ways of stabilizing a vehicle directly by means of vibration dampers (e.g., DE 10 2004 019 991 A1); in this wheel suspension, a vibration damper is provided with a housing, a piston rod, and a main spring connected in parallel to the piston rod. In this prior art, an actuatable piston arrangement can be adjusted relative to the vehicle body to stabilize the rolling; this makes it possible to obtain a controllable or partially active motor vehicle chassis of simple design and short adjustment distances. These known wheel suspensions all suffer from the disadvantage of complicated construction and also require an appropriate external energy source to make the required distance adjustments.

SUMMARY OF THE INVENTION

An object of the invention is to create a wheel suspension which provides stabilization against rolling, which can be produced at low cost, and which, even though it does not need any external energy or an electronic position control system, can nevertheless act quickly and effectively.

To achieve this object, the piston arrangement cooperating with the piston rod is installed with freedom of axial movement in a cylinder, where a flow connection connects a space above the cylinder to a space below the cylinder of the piston arrangement, and a shut-off element is located in the flow connection.

According to another feature, a spring acts on at least one end surface of the piston arrangement. It is advantageous here for the spring to be a coil spring and/or a gas spring. It is also possible for the gas spring to be located outside the piston-cylinder assembly.

According to an essential feature, the shut-off element can be controlled externally. It is advantageous for the control of the shut-off element to be implemented by way of a sensor.

According to another embodiment, a solenoid valve is provided as the shut-off element.

According to a favorable embodiment, the piston of the piston arrangement is sealed around its outer circumference against the cylinder.

According to another embodiment, a sealing ring is held in a groove in the piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2-6 show detailed cross-sectional views of a piston arrangement in its various functional stages;

FIGS. 7 and 8 show cross sections of another embodiment of a piston arrangement;

FIGS. 9 and 10 also show cross sections of a piston arrangement; and

FIGS. 11 and 12 show additional embodiments with an externally installed spring.

DETAILED DESCRIPTION OF THE PRESENTLY PREFERRED EMBODIMENTS

Figure 1B:
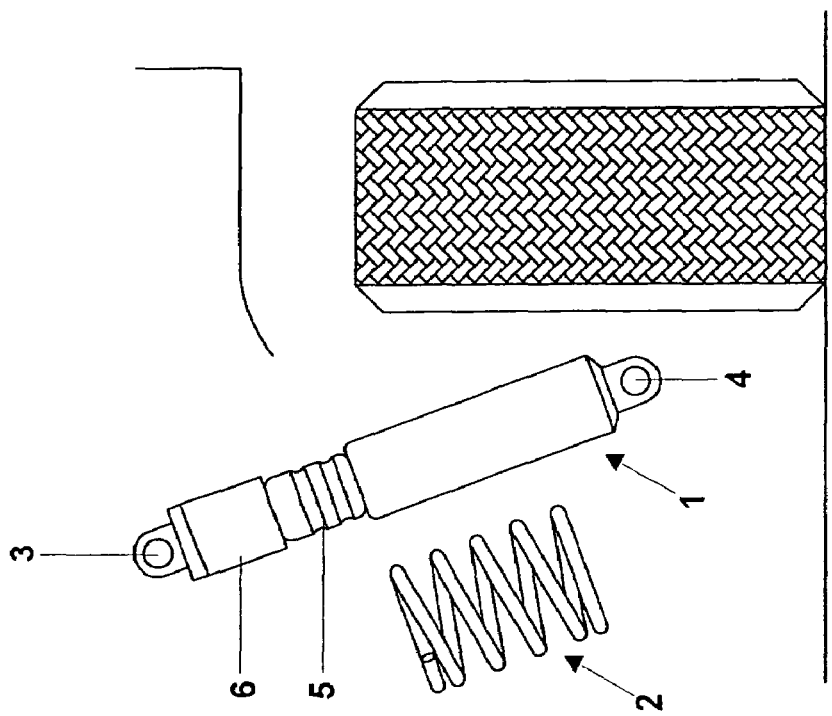
FIG. 1b shows a schematic diagram of a wheel suspension for a motor vehicle according to the invention.
Figure 1A:
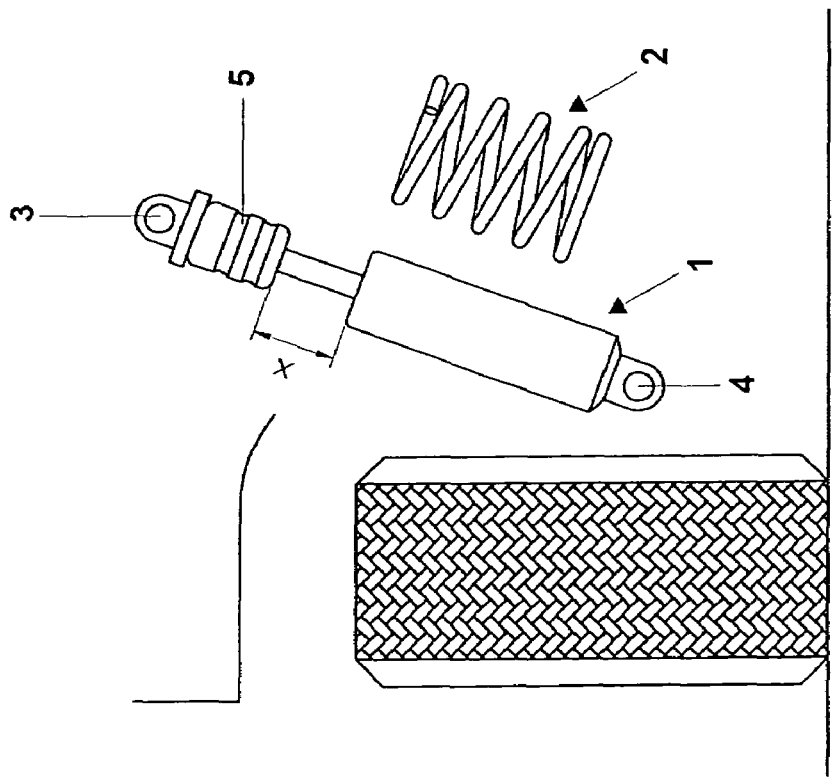
FIG. 1a shows a schematic diagram of a wheel suspension for a motor vehicle according to the prior art.

FIG. 1a shows the suspension of a vehicle with a conventional design, whereas FIG. 1b shows a piston-cylinder assembly 1 according to the invention. In both designs, a main spring 2 is provided parallel to the assembly; the upper mount 3 and the lower mount 4 serve to attach the piston-cylinder assembly 1 to the vehicle. An additional spring 5 works together with the main spring 2 in such a way that the overall spring rate toward the stop end has a highly progressive course. This progressive course is important, because it is needed to provide the vehicle with appropriate support, especially when traveling around curves. According to FIG. 1a, the additional spring 5 with its highly progressive course does not usually go into action for comfort reasons until a free distance X has been used up. The additional spring 5 is preferably made of PU or elastomeric material, but a steel spring could also be readily used.

A damping system is therefore comfortable as long as it has an appropriate free distance X, but this damping system becomes uncomfortable and nonrolling when the free distance X is used up and approaches zero.

FIG. 1b shows in addition a piston arrangement 6, which also provides the free distance X, but which also, when needed, allows the additional spring 5 to go promptly into action.

So that the piston arrangement 6 can go into action, it is possible, for example, for the impulse which activates the stabilizing function of the piston arrangement 6 to be derived from a transverse acceleration sensor in the vehicle. In the case of vehicles of modern design with an electronic stability program (ESP), the existing steering angle sensor can also be easily used to activate the piston arrangement 6.

FIG. 2 shows a piston-cylinder assembly 1 similar to that illustrated in FIG. 1b, but not showing the main spring 2 and the wheel or tire of the motor vehicle. The piston arrangement 6 has a piston 7, which is permanently connected at one end to the upper mount 3 and at the other end to the piston rod 8. The upper space 9 is connected by a flow connection 10 to the lower space 11, and a shut-off element 12 is integrated into the flow connection 10.

The piston 7 is enclosed by a cylinder 13, which can slide in a sealed manner on the piston rod 8 in both the upper and lower areas. The piston 7 also slides on the cylinder 13 by way of a sealing ring 17 received in a circumferential groove in the piston. A spring 14, which is designed as a coil spring 14a in the exemplary embodiment according to FIG. 2, is located in the lower space 11. One end is supported against the piston 7, and the other end is supported against the bottom of the cylinder 13, thus ensuring that the additional spring 5 is always held in contact with the damper-side stop surface 15 on top of the working cylinder 16. The re-leveling of the additional spring 5 should extend at least as far as the level of the vehicle; that is, it should cover the entire inward-deflection range of the piston-cylinder assembly 1.

Because the shut-off element 12 is open in this diagram, the hydraulic fluid 16 can pass through the flow connection 10 from the upper space 9 to the lower space 11 and vice versa, and thus the additional spring 5 will follow the stop surface 15 at least as far as the level of the vehicle.

FIG. 3 shows the shut-off element 12 in the open state. That is, the hydraulic fluid 16 can flow back and forth between the upper space 9 and the lower space 11. The free distance X, as FIG. 3 shows in comparison to FIG. 2, is being used; the additional spring 5 goes into action at the moment that the free distance X is used up completely. The spring 14 is compressed by an amount equivalent to the free distance X.

It can then be derived from FIG. 4 that, as the piston rod 8 continues to travel inward into the piston-cylinder assembly 1, the additional spring 5 is compressed until it becomes a solid block.

In FIG. 5, the shut-off element 12 has been switched to the closed position; the shut-off element 12 can, for example, be actuated by means of a solenoid valve, or the shut-off element 12 can itself be a solenoid valve, which makes it possible, by way of a known transverse acceleration sensor, for the stabilizing additional spring 5 to go into action as soon as the vehicle starts to travel around a curve or changes lanes. The hydraulic flow connection 10 from the upper space 9 to the lower space 11 is blocked in this case, and the piston 7 is thus arrested with respect to the cylinder 13.

In FIG. 6, the additional spring or buffer 5 has been compressed into a solid block as a result of the inward deflection of the system. It can be seen in comparison with FIG. 4 that, with the shut-off element 12 closed, the piston 7 has not been displaced in the cylinder 13.

FIGS. 7-10 show a piston arrangement 6 which is not part of a working cylinder assembly, but may be installed parallel to the working cylinder and main spring. Here the cylinder 13 is fixed with respect to a sprung suspension member 18 and the piston rod 8 is fixed to a housing 19 on which the additional spring 5 is mounted as a buffer between the piston rod 8 and the vehicle body 20. The shut-off valve 12 is located in the cylinder 13 and (when open) permits the piston 7 to travel a free distance X before the spring 5 is compressed.

The shut-off element 12 is shown open in FIGS. 7 and 8, so that the hydraulic fluid 16 can flow from the upper space 9 to the lower space 11 and vice versa.

When the shut-off element 12 is closed, as can be seen in FIGS. 9 and 10, no hydraulic fluid flows through the flow connection 10, and the piston 7 of the piston arrangement 6 is held in place, so that the additional spring 5 goes into action immediately. The cylinder 13 can, for example, be mounted either on a vertical axis or rotated with respect to the body of a vehicle.

FIGS. 11 and 12 show another embodiment of a piston arrangement 6, where, instead of a coil spring 14a according to FIGS. 2-10, a gas spring 14b is provided. Here, too, the piston 7 is located in a cylinder 13, and hydraulic fluid flows through the flow connection 10 into the upper space 9 or the lower space 11, as already shown in principle in FIGS. 2-10.

When a gas spring 14b is used, an additional space is required in the flow connection 10 to hold the gas. The piston rod 8 in FIG. 11 has different diameters above and below the piston 7, so that different amounts of hydraulic fluid are displaced in the two different flow directions.

FIG. 12 merely shows a piston 7 and a piston rod 8, which passes through the upper space 9, so that here different surface areas of the piston 7 are available to act upon the hydraulic fluid in the working cylinder 16. In the embodiments according to FIGS. 11 and 12 as well, the shut-off valve 12 can be actuated as needed either electrically or magnetically, corresponding in principle to the embodiments already described.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A wheel suspension comprising:
a working cylinder;
a main spring in parallel with the working cylinder;
a piston rod extending from the working cylinder and being movable into and out of the working cylinder, the piston rod having a longitudinal axis, the piston rod having fixed thereto a piston and a mount for fixing the piston rod against movement with respect to a vehicle body;
an adjusting cylinder in which the piston is mounted with freedom of axial movement, the adjusting cylinder being movable with respect to the working cylinder, the piston dividing the adjusting cylinder into a space above the piston and a space below the piston;
an additional spring located on said longitudinal axis for supporting said adjusting cylinder against said working cylinder;
a flow connection connecting the space above the piston to the space below the piston; and
a shut-off element provided in the flow connection, the shut-off element being movable between an open position, wherein the piston can move with respect to the adjusting cylinder, and a closed position, wherein the piston essentially cannot move with respect to the adjusting cylinder.

2. The wheel suspension of claim 1 further comprising a piston spring loading said piston axially with respect to said adjusting cylinder.

3. The wheel suspension of claim 2 wherein the piston spring comprises a coil spring.

4. The wheel suspension of claim 2 wherein the piston spring comprises a gas spring located outside of said adjusting cylinder.

5. The wheel suspension of claim 1 wherein the shut-off element is controlled externally.

6. The wheel suspension of claim 1 wherein the shut-off element is controlled by a sensor.

7. The wheel suspension of claim 1 wherein the shutoff element is a solenoid valve.

8. The wheel suspension of claim 1 wherein the piston has a circumference which is sealed against the adjusting cylinder.

9. The wheel suspension of claim 8 wherein the piston has a circumferential groove holding a sealing ring.

* * * * *